Patented Aug. 9, 1932

1,871,195

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PRODUCTION OF PHOSPHATIC FERTILIZER

No Drawing. Application filed September 19, 1929. Serial No. 393,836.

This invention relates to the production of phosphatic fertilizers. In the present method of preparing acid phosphate, ground phosphatic material, such as phosphate rock, is treated with an acidulating agent such as sulphuric acid. The materials are first mixed in an open mixing pan provided with rotating paddles, and the resulting slurry dumped into a den. The material is allowed to remain in the den for twenty-four hours more or less and is then removed to a curing shed. In the curing process it is the customary practice to aerate the material at intervals to insure the reduction of free water and acid. In many instances it is also the practice to dust the material, after removal from the den, with an acid absorbent such as lime or ground phosphate rock.

In the preparation of double-superphosphates, the procedure is quite similar to that used in mixing acid phosphate, the major difference residing in the use of phosphoric in lieu of sulphuric acid.

These prior processes presented certain disadvantages. Because of the methods employed it required a relatively long period of time to prepare the material in final form. Due to the rapidity of the action between the acid and rock, solid reaction products were formed and caused the mass to attain a semi-solid consistency in a very short period. This set-up prevented thorough mixing of the rock and acid, and hence tended to insure the presence of free acid and unattacked rock in the product. The presence of the free acid necessitated such steps as dusting with an acid absorbent or remilling to insure further contact with the rock. These undesirable conditions tend to be accentuated when a strong acid is employed, because the reaction proceeds with more vigor and the final solid products are formed at an early stage.

It is an object of this invention to provide a process for manufacturing phosphate fertilizers which may be completed in a very short period of time.

Another object is to provide a process for manufacturing phosphatic fertilizers in which the concentration of the acid employed is adjusted by dilution with a material having a fertilizer value and the digestion of unavailable phosphatic materials with this reagent.

Another object is to treat phosphatic materials with a special type of reagent under controlled conditions of superatmospheric pressure and elevated temperature.

A further object is to prepare a fertilizer product in which is incorporated a number of fertilizing constituents uniformly distributed.

With these and other equally important objects in view the invention comprehends the special treatment of phosphatic raw material with a special type of reagent. The special treatment comprises the digestion of unavailable phosphatic material under controlled conditions of superatmospheric pressure and elevated temperature in a zone in which the components of the reactive ingredients are maintained or regulated. The acidulating agent employed comprises a solution of a salt having a fertilizer value and a strong mineral acid, such, for example, as sulphuric or phosphoric acid.

It has been found, as described in application Serial No. 304,789, that the time necessary for preparing a phosphatic fertilizer may be greatly diminished by charging predetermined quantities of the phosphatic raw material and an acidulating agent to an autoclave and then digesting or converting the unavailable phosphatic material to an available form.

It has likewise been found that in order to obtain improved results, the physical and chemical conditions of the reactions should be carefully controlled. As described in that aplication, the process comprises the passage of definitely maintained quantities of acid and rock dust to a compounding stage and thence to a reaction stage.

Numerous experiments have proven that the concentration of the acid is a peculiarly important factor in the process. In the preparation of acid phosphates, the acid employed performs a number of functions. In the first place, it, of course, performs its acidulating function; that is to say, it reacts with the tricalcium phosphate to ultimately form mono and/or dicalcium phosphate. In addition to this, however, the acid, by reason of its water of dilution, serves as a carrier for the potential water of constitution of the final products. For a given minimum there is a theoretically definite optimum quantity of water which should be contained in the acid solution. If the acid is too dilute, not only are the reactions retarded, but a high excess of water over that necessary for crystallization remains after the termination of the reactions. This manifestly prolongs the drying period. If the acid is too strong, the reactions proceed with difficultly controllable vigor and, in many instances results in an incompletely crystallized product.

In certain circumstances, and particularly in the process of autoclaving, it is highly desirable to reduce the strength of the acid to that which would be obtained by the addition of that quantity which is required for water of crystallization.

The present method contemplates the use of a reagent in which sufficient water, as water dilution, is brought into the reaction and the acidity of the reagent is further reduced, and preferably by the use of a material which serves to introduce additional fertilizer constituents into the final product.

The preferred method of operation, therefore, comprises the charging of an autoclave with a compounded mix of ground phosphatic material and a reagent comprising a sulphuric acid solution of ammonium sulphate or, in the case of double superphosphates, a phosphoric acid solution, ammonium phosphate. The mass is maintained in the autoclave under controlled conditions of temperature and pressure to insure digestion or conversion of the unavailable phosphatic material to an available form. As explained in the application above referred to, the material within the autoclave may be maintained under the autogenously generated pressures. If desired, the pressure within the autoclave may be controlled by withdrawing a quantity of the gases and/or vapors and admitting an inert gas from an extraneous source. Under certain circumstances we found it advantageous to add gases and vapors from extraneous sources which have a controlling effect upon reaction, as for example by admitting $CO_2$ to materially modify the quantity of carbon dioxide gas evolved during the reaction.

Such a method is particularly well suited to the production of a fertilizer base; that is to say, a fertilizer containing both available phosphatic and nitrogenous constituents. It has been proposed to obtain a fertilizer product having both available phosphate and nitrogen by first preparing acid phosphate and double superphosphate, and then ammonifying the phosphatic fertilizer. Such a process has been described in our copending applications, Serial Nos. 185,066, filed April 19, 1927, and 387,258.

In the proposed method, the nitrogenous content is added to the acidifying agent before conversion of the latter, and is added, as explained, in such a manner as to materially modify the concentration of the acid without disadvantageously affecting the crystallizing and drying stages.

The present method presents other advantages. As pointed out, one method of preparing a fertilizer having both phosphatic and nitrogenous constituents is to first prepare the available phosphate and then ammonify with gaseous anhydrous or aqueous ammonia. A draw-back of such processes resides in the fact that the exothermic heat of the reaction between the ammonia and phosphatic material is quite high. If an appreciable quantity of ammonia is to be added, the acid phosphate or double superphoshate must be cooled. Such cooling is an expensive step. In the described methods, on the other hand, the ammonia is added before the conversion of the phosphatic, and the exothermic heats are advantageously employed to accelerate the reactions.

In carrying out the process, anhydrous, gaseous, or, in some cases, aqueous ammonia is passed into sulphuric (or phosphoric) acid of a relatively high acidity, and in quantities sufficient to reduce the acid to the required acidity for mixing. As an example, 60° Bé. acid is substantially 77.67% sulphuric acid. It is possible to pass ammonia into the acid and cut the percentage of sulphuric acid to 72.75%, which is the equivalent of 57° Bé. acid, and yet have an unsaturated solution.

As indicated previously, there are limitations placed on the strength of the acid which may be employed, because of the necessity of the presence of available water for water of crystallization. Thus, if 66° Bé. acid were employed, the acidity could still be reduced by adding ammonia, forming ammonium sulphate, and taking this up in solution in the acid to just below the saturation point, but the resulting reagent would contain an insufficient quantity of water, and crystallization of the products would be difficult.

The reagent may be made up as a batch by passing a predetermined quantity of ammonia into a known amount of acid. This reagent may then be charged through a pipe to a compounding stage, to be there mixed with rock, as explained in application Serial No. 304,789. It will be appreciated, however, that the process may be made continuous by passing a stream of the ammonia into a moving stream of the acid, and then compounding the acid and dissolved ammonium salts with the rock. It is likewise apparent that the acid to which ammonia is added may comprise any desired percentage mixture of sulphuric and phosphoric acid.

The compounded mixture charged to the autoclave is treated as described in application Serial No. 304,789; that is to say, it is digested or converted under controlled superatmospheric pressure and temperature, which temperature is maintained below the decomposition temperature of the ammonium salts at the pressure employed. It will be noted that since the digestion as carried out in a confined space, any ammonia which might be evolved is retained and rendered available for combination with the reaction products.

It will now be appreciated that the described process of preparing fertilizer by autoclaving phosphatic material with an acid solution of an ammonium salt presents many advantages. It provides a means of controlling acidity of the acid without, however, disadvantageously affecting the crystallizing and drying operations. Furthermore, it presents a method of introducing addition fertilizer values, which obviously are uniformly distributed through the phosphatic material.

While a preferred method has been described, it will be appreciated that this is given merely for the purpose of more clearly explaining the invention. Other materials may be introduced into the acid to diminish its acidity, and these may be so chosen as to impart the desired characteristics to the final product.

We claim:

1. A method of manufacturing phosphatic fertilizers comprising digesting in a confined space under controlled superatmospheric pressure and temperature, a substantially unset mixture of unavailable phosphate rock dust and an acidulating agent consisting of a strong mineral acid and an ammonium salt of that acid, mechanically agitating the mass, retaining it in the confined space for a period of time sufficient to effect substantial conversion of the unavailable phosphate to available form, and then releasing the pressure in the confined space to effect crystallization and drying of the reaction mass, and continuing to agitate the mass during the crystallization and drying thereof.

2. A method of manufacturing phosphatic fertilizers comprising digesting in a confined space under controlled super-atmospheric pressure and temperature a substantially unset mixture of unavailable phosphate rock dust and an acidulating agent consisting of a strong mineral acid and an ammonium salt of that acid, mechanically agitating the mass, retaining it in the confined space for a period of time sufficient to effect substantial conversion of the unavailable phosphate to available form, and then releasing the pressure in the confined space and reducing the pressure in the confined space below atmospheric to effect crystallization and drying of the reaction mass.

3. A method of manufacturing phosphatic fertilizers comprising digesting in a conconfined space under controlled superatmospheric pressure and temperature, a substantially unset mixture of unavailable phosphate rock dust and an acidulating agent consisting of sulphuric acid and ammonium sulphate, mechanically agitating the mass, retaining it in the confined space for a period of time sufficient to effect substantial conversion of the unavailable phosphate to available form, and then releasing the pressure in the confined space to effect crystallization and drying of the reaction mass, and continuing to agitate the mass during the crystallization and drying thereof.

4. A method of manufacturing phosphatic fertilizers comprising digesting in a confined space under controlled superatmospheric pressure and temperature, a substantially unset mixture of unavailable phosphate rock dust and an acidulating agent consisting of sulphuric acid and ammonium sulphate, mechanically agitating the mass, retaining it in the confined space for a period of time sufficient to effect substantial conversion of the unavailable phosphate to available forms, and then releasing the pressure in the confined space, and reducing the pressure in the confined space below atmospheric to effect crystallization and drying of the reaction mass.

5. A process of preparing phosphatic fertilizer comprising digesting ground phosphatic material with an acidifying agent consisting of a solution of ammonium phosphate in phosphoric acid in a stage maintained under controlled superatmospheric pressure and temperature.

6. A process of preparing phosphatic fertilizer comprising digesting ground phosphatic material with an acidifying agent consisting of a solution of ammonium phosphate and phosphoric acid in a confined space under superatmospheric pressure and temperature, and subsequently drying the material under a controlled lower pressure and elevated temperature.

7. A process of preparing phosphate fertilizer comprising compounding ground phosphatic material with an acidulating agent consisting of a solution of ammonium phosphate and phosphoric acid, passing the material to an autoclave and digesting it therein under superatmospheric pressure and temperature.

8. A method of preparing phosphate fertilizer comprising mixing ground phosphatic material with an acidulating agent which consists of phosphoric acid into which ammonia has been passed, digesting the mixture under controlled superatmospheric pressure and temperature.

9. A method of preparing phosphate fertilizer comprising mixing ground phosphatic material with an acidulating agent which consists of phosphoric acid into which ammonia has been passed, digesting the mixture under controlled superatmospheric pressure and temperature, and then crystallizing and drying the material.

In testimony whereof we affix our signatures.

BEVERLY OBER.
EDWARD HYATT WIGHT.